United States Patent [19]
De Haan

[11] Patent Number: 6,111,589
[45] Date of Patent: Aug. 29, 2000

[54] METHOD AND DEVICE FOR BLANKING A PAGE OF IMAGE OVERLAY INFORMATION WHEN AN INFORMATION PACKET IS MISSING

[75] Inventor: Wiebe De Haan, Eindhoven, Netherlands

[73] Assignee: U.S. Philips Corporation, New York, N.Y.

[21] Appl. No.: 08/691,776

[22] Filed: Aug. 2, 1996

[30] Foreign Application Priority Data

Aug. 4, 1995 [EP] European Pat. Off. ............. 95202135

[51] Int. Cl.⁷ .................................................. G06T 13/00
[52] U.S. Cl. ........................................... 345/473; 345/435
[58] Field of Search ..................................... 345/473, 435

[56] References Cited

U.S. PATENT DOCUMENTS

| | | | |
|---|---|---|---|
| 5,459,819 | 10/1995 | Watkins et al. | 345/435 |
| 5,459,826 | 10/1995 | Archibald | 345/435 |
| 5,553,211 | 9/1996 | Uotani | 345/435 |
| 5,594,850 | 1/1997 | Noyama et al. | 345/435 |
| 5,608,852 | 3/1997 | Hashimoto et al. | 345/435 |
| 5,754,186 | 5/1998 | Tam et al. | 345/435 |

FOREIGN PATENT DOCUMENTS

WO9200647   1/1992   WIPO .

*Primary Examiner*—Mark R. Powell
*Assistant Examiner*—HueDung X. Cao
*Attorney, Agent, or Firm*—Leroy Eason

[57] ABSTRACT

Picture information intended for being displayed on a picture screen contains not only the main information such as film pictures, but also overlay information such as graphic information or subtitles. The overlay information is transmitted separately from the main information and is encoded in packets of digital symbols in which a page of overlay information is represented by a group of packets. All the packets include identification information sufficient for a receiver to identify whether all packets of a group have. This makes it possible to ascertain whether a page of overlay information has been received completely, which allows incomplete pages or combinations of parts of pages from being displayed on the picture screen. This is advantageous in the case of interruptions of picture signal reception, such as a disturbed TV signal, or when a video disc or tape is used in trick modes such as Fast Forward.

29 Claims, 3 Drawing Sheets

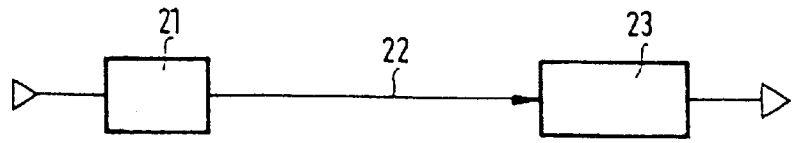
FIG.2
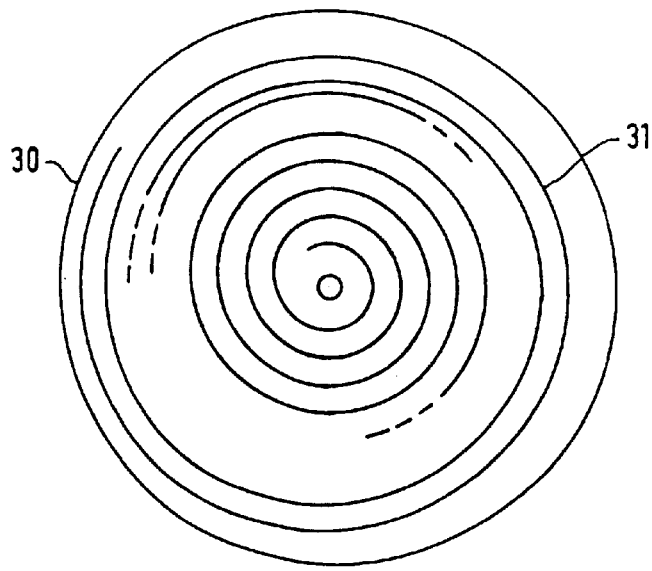
FIG.3
FIG.4
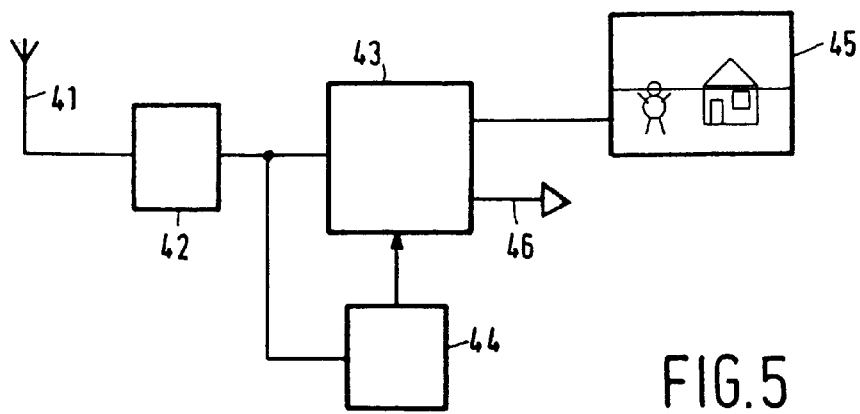
FIG.5

METHOD AND DEVICE FOR BLANKING A PAGE OF IMAGE OVERLAY INFORMATION WHEN AN INFORMATION PACKET IS MISSING

The invention relates to a method of transmitting picture information intended for being displayed on a picture screen via an information signal that represents the picture information, the picture information comprising main information and overlay information related to the main information, the overlay information being subdivided into pages and the pages being represented by a group of packets of information symbols.

The invention further relates to an information carrier on which an information signal is recorded that represents picture information intended for being displayed on a picture screen, the picture information comprising main information and overlay information related to the main information, the overlay information being subdivided into pages and a page being represented by a group of packets of information symbols.

The invention further relates to an information receiving and an information transmitting device to be used in the method.

Such a method, information carrier and device are known from WO 92/00647. A picture signal whose main information is analog video information is transferred via a laser disc. Digitally coded subtitle information is then recorded on the laser disc separate from the video information as overlay information in the digital audio signal subcode. The subtitle information of a page is distributed over a group of subcode packets in which a first packet contains a header and the last packet an end code.

In the known method it may occur that not all the packets are received completely owing to errors or interruptions during transmission. A direct result of this is that incomplete or erroneously combined parts of overlay pages are shown on the picture screen, which is highly annoying. This may specifically happen if only fragments of the information signal are received, for example, in the case of a disturbed TV signal, or when a video disc or tape is used in trick modes such as Fast Forward or Backward.

It is an object of the invention to provide means for picture information transmission in which the display of mutilated overlay pages is largely avoided.

According to a first aspect of the invention, a method of a type defined in the opening paragraph is characterized in that each packet of a group has identification information indicative of a relation of the packet to the respective group. The method according to the invention is advantageous, for example, in that it is possible to block the display of a mutilated page if the identification information shows that one or more information packets of a group are lacking, or not all the received packets belong to the same group.

An embodiment of the method according to the invention is characterized in that the identification information contains a page number. This embodiment is advantageous in that it is possible in a simple manner to ascertain whether all the information packets received since the beginning of the group belong to this respective group.

A further embodiment of the method according to the invention is characterized in that the identification information contains a serial number which serial number is adapted within a group in a predetermined manner, while the serial number of the first or last packet of the group has a predetermined value. This embodiment is advantageous in that it is possible to ascertain whether one or more information packets are lacking if packets are received not having successive serial numbers. When a packet having a serial number of a predefined value is received, it then also appears that a group begins or has been fully transmitted.

A further embodiment of the method according to the invention is characterized in that the identification information contains a flag that has a different value for the first or last packet of a group. This embodiment is advantageous in that it is simply possible to ascertain whether a new group commences or has been fully transmitted.

A further embodiment of the method according to the invention is characterized in that the main information contains video information and the overlay information contains graphic information. This embodiment is advantageous in that the main information is a moving picture and the overlay information is a graphic picture optionally to be superimposed thereon.

A further embodiment of the method according to the invention is characterized in that the overlay information contains subtitle texts. This embodiment is advantageous in that subtitle texts may be optionally superimposed on the main information.

A further embodiment of the method according to the invention is characterized in that the main information contains digital, compressed video information. This embodiment is advantageous in that both the main information and the overlay information may be transmitted in the same manner, represented by digital symbols.

According to a second aspect of the invention, an information carrier of a type defined in the opening paragraph is characterized in that each packet of a group contains identification information indicative of a relation of the packet to the respective group. The information carrier according to the invention is advantageous, for example, in that it is possible to block the display of a mutilated page if it appears from the identification information that one or more information packets of a group are lacking, or that not all the received packets belong to the same group, for example, when trick modes are used such as playing an information carrier Backward or Fast Forward.

According to a third aspect of the invention, a device comprising means for receiving an information signal of a type defined in the opening paragraph and combining means for generating a picture signal representative of the main information combined with the overlay information is characterized in that the device comprises check means for generating a page-incomplete signal in response to the identification information and in that the combining means are adapted for blocking the display of a page of overlay information in response to the page-incomplete signal. The device according to the invention is advantageous, for example, in that fewer mutilated overlay pages are displayed on the picture screen.

According to a fourth aspect of the invention, a device comprising generator means for generating an information signal of a type defined in the opening paragraph and comprising means for transmitting the information signal is characterized in that the device comprises generator means for generating the identification information and in that the generator means are adapted for appending identification information to the packets of overlay information.

These and other aspects of the invention will be apparent from and elucidated with reference to the embodiments described hereinafter.

In the drawings:

FIG. 2 shows a system for transmitting picture information,

FIG. 3 shows a table of identification information,

FIG. 4 shows an information carrier,

FIG. 5 shows a device for receiving picture information,

In the drawing Figures, elements corresponding to elements already described carry like reference characters.

Figure 1A:
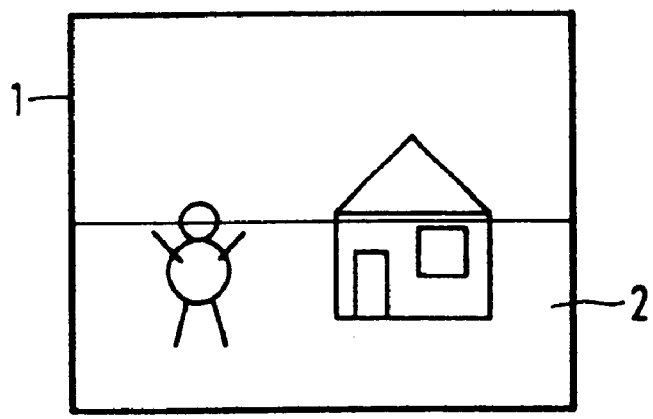
FIG. 1 shows a picture screen with picture information.
Figure 1B:
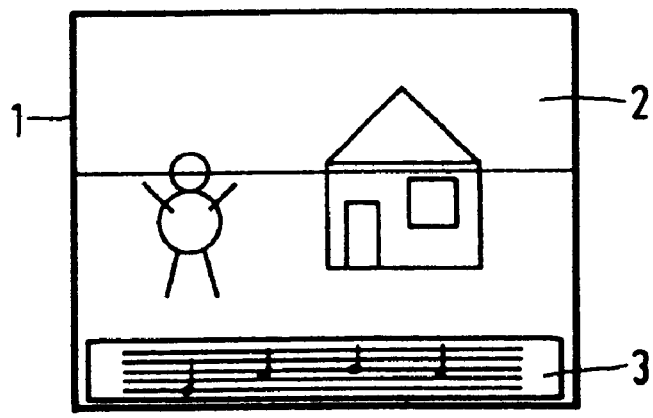
Figure 1C:
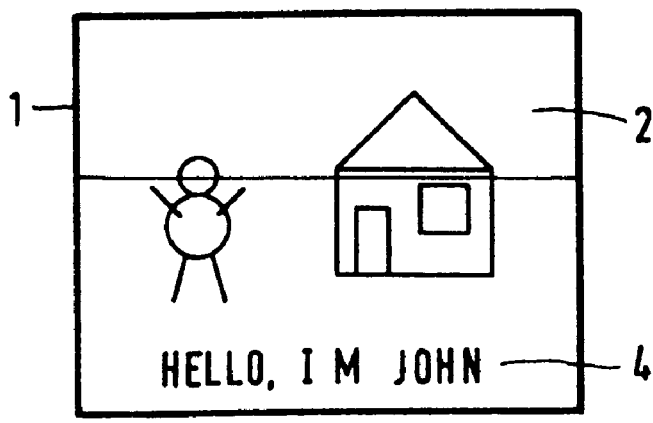

FIG. 1 shows a picture screen 1 on which picture information is shown. This picture information comprises main information 2 shown over the entire surface of the picture screen, as is done in FIG. 1a. The main information 2 may consist of moving pictures such as film pictures or a television program. The main information may also comprise animations or still, photographic pictures. FIG. 1b shows the same main information 2 on which graphic information 3 is superimposed as overlay information. For example, in the background the main information 2 may remain the same, whereas ever new musical notes are shown as overlay information. FIG. 1c shows a subtitle text 4 as overlay information, as this may be used for films. For a TV system the overlay information is combined, prior to transmission, with the main information and co-transmitted in each picture of the main information. By transmitting the overlay information separately, as is done, for example, in said WO 92/00647, more than one piece of overlay information can be co-transmitted. The user may then choose, for example, from several languages, or the subtitles 4 may be omitted entirely. Another example of a method of transmitting overlay information is the known TV system with teletext. In this system pages of additional information are transmitted consecutively in an invisible part of the video signal in which a page number is included at the beginning of a page. Teletext is used, for example, for co-transmitting subtitles for the hard of hearing.

FIG. 2 shows a system for transmitting picture information. The picture information is transmitted by an information signal, such as, for example, a television signal, a digitally modulated signal via a network or a recorded signal on a magnetic tape, such as VCR (Video Cassette Recorder) or on an optical disc such as a laser disc or digital videodisc. The device 21 for transmitting the information signal transmits the picture information by the transmission channel 22 to the device 23 for receiving picture information. The receiving device 23 reproduces the picture signal for the user. The information signal comprises at least a representation of the main information, such as, for example, an analog video signal according to the PAL or NTSC standard, or a digitally coded and compressed video signal according to MPEG-1 or MPEG-2. The information signal furthermore comprises a representation of the overlay information, coded by information symbols which symbols can be recovered separate from the main information. An overlay information page that is to be shown as a whole on the picture screen, can be co-transmitted with every new picture; however, this takes up much transmission capacity. Another option is the transmission of a continuous series of symbols, as a result of which, however, the transmission capacity for other parts of the signal is interrupted for a long period of time. Consequently, or due to the type of transmission channel, the overlay information of each page is often transmitted in a group of packets of information symbols, such as, for example, in said WO 92/00647 in packets in the digital audio signal subcode. The first packet then contains a header and the last packet an end code. In a video signal, the symbols may be co-transmitted in the form of digital signals during horizontal or vertical blanking. In fully digital information streams, a separate data stream of user data may be co-transmitted by multiplexing, for example, by subdividing the digital stream into packets of, for example, 2048 bytes and appending a header to the packets which denotes the type of information. In MPEG-2, the picture information coded as described in international standard ITU/ISO 13818-2. In the ITU/ISO 13818-1 standard is described how elementary streams of coded video data are multiplexed together with other coded data which are representative of, for example audio and subtitles to an MPEG-2 program stream. Information of a type not specified by MPEG may be included in 'private packets' in a randomly selectable format. MPEG-2 packets with an additional header that has a prescribed format are referenced "private stream 1" and without as "private stream 2". The subtitles may be included, for example, in private stream 1 packets.

In the information signal according to the invention, each packet of a group contains identification information indicative of a relation of the packet to the respective group. The identification information may indicate, for example, whether packets belong to the same group and whether successively received packets have also been transmitted successively. The information signal contains, as described above, symbols intended for the overlay information, for example, in private packets in an MPEG-2 stream. Identification information is now included at the beginning of a packet and a packet contains information of no more than one overlay page.

FIG. 3 shows in a Table an example of identification information according to the invention which is appended to each overlay information packet in an MPEG-2 stream. The content of a private packet for overlay information is indicated by private_data_field and this establishes the content for each subtitle packet. The available number of bits is given for each parameter. A page_complete_flag 25 indicates the end of the page, thus the last packet of a group. A packet_sequence_count 26 indicates a serial number of the packets within a group, the first packet having packet_sequence_count=0 and the next packets one up. This facilitates discovering the lacking of a packet in a simple manner. A page_number 27 indicates for each packet the unique page number of the overlay page to which this packet belongs. This page number may help avoid erroneously combining two parts of pages if, for example, after packet_sequence_count=5 of a specific overlay page, an interruption in the signal takes place and packet_sequence_count=6 of a next page is received first. Then comes the actual content of the overlay page, the subtitle_payload 28, which takes up the rest of the packet.

In other embodiments of the invention, it is also possible to use cyclically counting parameters as a page number and/or serial number. This is advantageous in that less transmission capacity is needed for the overhead of the identification information. For example, 3 bits could be used as a page number and 5 bits as a packet serial number. After an interruption of arbitrary length, there is no more than about 3% chance of an overlay page with a lacking part being displayed, that is to say, if exactly a multiple of 32 packets in a page is lost. There is only a <1% chance that data of two pages are combined, that is to say, if exactly a multiple of 8 pages is lost and, in addition, the serial number exactly fits in. Alternatively, in lieu of a serial number in each packet, the total number of packets of the present page can be co-transmitted while in the first packet of a group that covers more than one packet a 0 can be placed, as required.

As a result, when a packet carrying a 0 or 1 is received, this is always the first packet of a group (in the case of 1 also the sole packet). The remaining packets have a page_length of 2 or more, while 2 then also denotes the last packet. The number of packets may furthermore be simply counted, while, in addition, it will always be known how many packets are still to be received. The latter may also be achieved by having a page_sequence_count start at the total number of packets and constantly reducing the count by unity, so that the last packet contains page_sequence_ count=1. The beginning of an overlay page may be indicated, as required, by a page_start_flag, unless this has already appeared from an available page header. Many other combinations of length indication, page numbering, start/end flags and serial numbering are possible as identification information. The use of only a page start flag together with a page end flag, however, does not identify sufficiently.

FIG. 4 shows a disc-shaped optically readable information carrier 30, such as a CD or laser disc. In a helical or concentric track 31 is recorded the information signal which represents picture information intended for being displayed on a picture screen. A description of reading a CD may be found in the title "Principles of optical disc systems" by Bouwhuis et al., ISBN 0-85274-785-3. The picture information and the information signal are described with reference to FIGS. 1 and 2. The overlay information there comprises identification information described with reference to FIG. 3, which information is indicative of a relation of the packet to the respective group.

FIG. 5 shows a device for receiving picture information, such as a satellite receiver or a television signal decoder also referenced set-top-box. The transmitted signal enters the receiving means 42 via an aerial 41 (no component part of the device) or via a cable link. In the receiving means 42 the information signal is recovered and applied to combining means 43 in which a picture signal is generated based on the main information combined with the overlay information. The information signal is likewise applied to check means 44 for generating a page_incomplete signal in dependence on the identification information, for example, as described with reference to FIG. 3. The beginning of an overlay page may then be derived from packet_sequence_count=0 by the check means 44, or from the previous last packet with page_complete_flag=active, but also from a header of the first packet of a group by the combining means 43. The check means 44 check from the beginning of an overlay page of each successively received packet whether the identification information corresponds to the identification information expected on the basis of the previous packet. Here a check is made whether the packet_sequence_count is each time 1 up and whether the page_number is the same. If the packet in which the page_complete_flag is active has been received, a page_incomplete signal is generated if a difference is established during said check. The combining means 43 receive the page_incomplete signal and are adapted for blocking the display of page overlay information in response to the page_incomplete signal. The picture signal may then be applied to the user through output 46. In another embodiment the device includes a picture screen 45 on which the picture is then shown directly.

Figure 6:
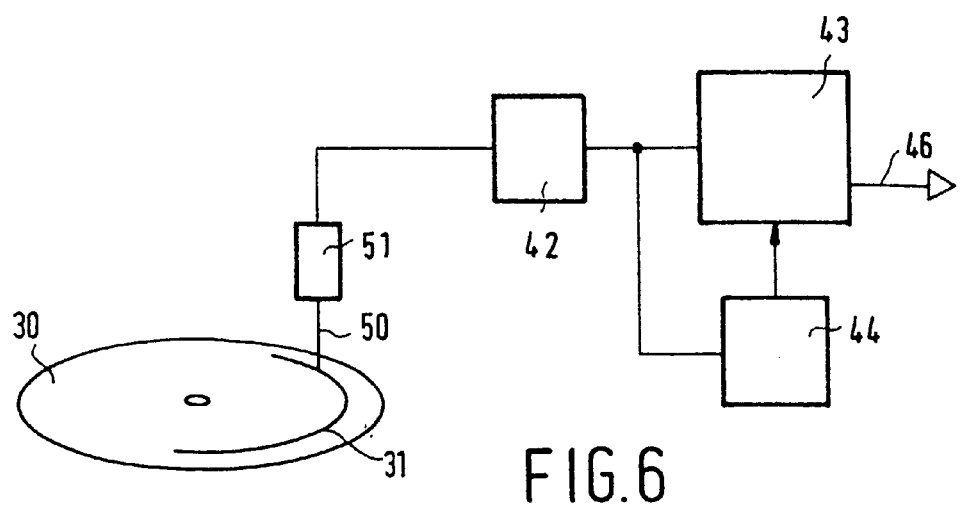
FIG. 6 shows a device for reading an information carrier.

FIG. 6 shows a device for reading an information carrier 30 such as, for example, a CD. The device comprises scanning means 41 for scanning the track 31 by an optical beam 50. The device further corresponds to the device shown in FIG. 5. The received signal goes to the receiving means 42 and after that to the combining means 43 and the check means 44 for the generation of a page_incomplete signal. The processing of the information signal is described with reference to FIG. 5.

Figure 7:
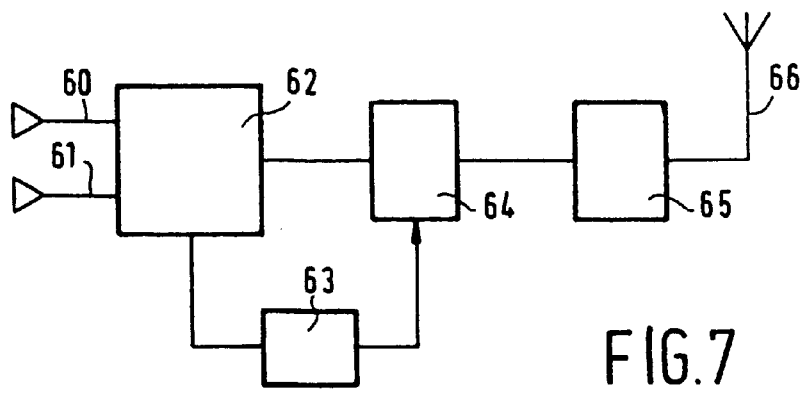
FIG. 7 shows a device for transmitting picture information.

FIG. 7 shows a device for transmitting picture information, such as, for example, a television transmitter. The picture information is applied to the picture generator means 62; the main information via an input 60 and the overlay information via a separate input 61. The picture generator means 62 code the picture information and generate the information signal, while the overlay information is coded in a group of packets per page. Information about the beginning, end and number of packets of an overlay page is applied to the identification information generator means 63 which, subsequently, for each packet generate identification information such as a page number or a serial number. At the beginning of a page, for example, the page_number is incremented by unity and the packet_sequence_count is set to zero. For subsequent packets the page_number remains the same and the packet_sequence_count is incremented; for the last packet the page_complete_flag is activated. In a multiplexer 64 the generated identification information is added to the overlay information, after which the complete information signal is amplified in the transmitting means 65 to be transmitted via aerial 66.

Figure 8:
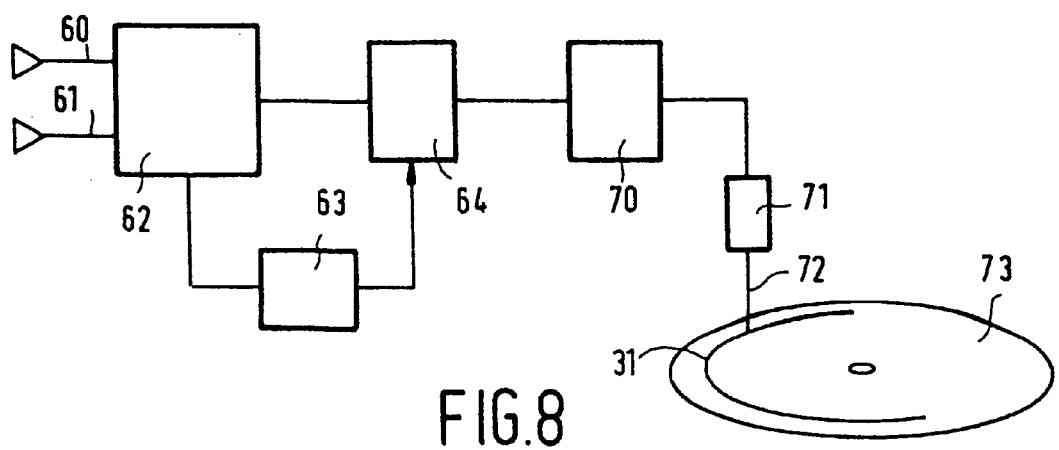
FIG. 8 shows a device for transmitting picture information by information carriers.

FIG. 8 shows a device for transmitting picture information via information carriers, such as, for example, for CD-ROMs. Initially, a mother information carrier is made by the device shown. Subsequently, multiple information carriers are manufactured from this mother information carrier via a customary process with moulds and presses (not shown). The complete information signal is generated by generator means (62, 63, 64) as described with reference to FIG. 7. The channel coding unit 70 codes the information signal in a manner customary for the disc-shaped carrier and transfers the signal to the radiation unit 71. Radiation unit 71 writes the coded information signal on the mother information carrier 73 by the radiation beam 72, for example, a high-intensity laser beam. A system control of a customary type (not shown) provides the control of the speed of rotation of the disc and the positioning of the radiation unit 71 over the track 31 for obtaining the desired pit and track density. For a further description of the CD system, reference be made to the title mentioned with respect to FIG. 4. In another embodiment a similar device is suitable for recording the information signal on an information carrier that can be played back directly, such as a CD recordable. Another embodiment is, for example, a device for writing and reading a VCR tape or an optical tape.

The embodiments of devices are not restricted to the illustrative embodiments of FIGS. 5, 6, 7 and 8 and comprise any device for receiving and/or transmitting picture information in which each packet of a group, which group represents an overlay page, has identification information that is indicative of a relation of the packet to the respective group.

I claim:

1. Method of transmitting picture information to a receiver for display on a picture screen via an information signal that represents the picture information, the picture information comprising main information and overlay information related to the main information, the overlay information being subdivided into pages and each page of overlay information being represented by a group of packets of information symbols, characterized in that each packet of each group of packets contains identification information sufficient for the receiver to identify a group to which each packet belongs and whether or not all packets for a group have been received and in that a page of overlay information represented by a group in which not all packets have been received is not displayed.

2. Method as claimed in claim 1, characterized in that the identification information contains a page number.

3. Method as claimed in claim 2, characterized in that the identification information contains a serial number which serial number is adapted within a group in a predetermined manner, while the serial number of the first or last packet of the group has a predetermined value.

4. Method as claimed in claim 3, characterized in that the identification information contains a flag that has a different value for the first or last packet of a group.

5. Method as claimed in claim 4, characterized in that the main information contains video information and the overlay information contains graphic information.

6. Method as claimed in claim 5, characterized in that the overlay information contains subtitle texts.

7. Method as claimed in claim 6, characterized in that the main information contains digital, compressed video information.

8. Information carrier on which an information signal is recorded that represents picture information intended for being displayed on a picture screen, the picture information comprising main information and overlay information related to the main information, the overlay information being subdivided into pages and each page being represented by a group of packets of information symbols, characterized in that each packet of any group of packets contains identification information sufficient to identify said any group and to determine whether or not said any group contains all of the packets for said any group, a page of overlay information represented by a group not containing all of the packets for that group being not displayed.

9. Information carrier as claimed in claim 8, characterized in that the identification information contains a page number.

10. Information carrier as claimed in claim 9, characterized in that the identification information contains a serial number, which serial number is adapted within a group in a predetermined manner, while the serial number of the first or the last packet of the group has a predetermined value.

11. Information carrier as claimed in claim 10, characterized in that the identification information contains a flag that has a different value for the first or last packet of a group.

12. Information carrier as claimed in claim 11, characterized in that the main information contains video information and the overlay information contains graphic information.

13. Information carrier as claimed in claim 11, characterized in that the overlay information contains subtitle text.

14. Information carrier as claimed in claim 12, characterized in that the main information contains digital, compressed video information.

15. Device for transmitting picture information for display on a picture screen via an information signal that represents the picture information, the picture information comprising main information and overlay information related to the main information, the overlay information being subdivided into pages and each page of overlay information being represented by a group of packets of information symbols, the device comprising: means for receiving the information signal and combining means for generating a picture signal representative of the main information combined with the overlay information, characterized in that each packet of each group of packets contains identification information sufficient to identify the group to which each packet belongs and whether or not all packets for a group are included in the group and that the device further comprises check means for generating a page-incomplete signal in response to the identification information identifying that all packets for a particular group are not included in that particular group and in that the combining means is adapted for blocking the display of a page of overlay information in response to the page-incomplete signal.

16. Device as claimed in claim 15, characterized in that the check means are adapted for generating a page-incomplete signal when packets carrying different page numbers are received within one group.

17. Device as claimed in claim 16, characterized in that the receiving means comprise means for reading the information signal from an information carrier as defined in claim 8.

18. Device as claimed in claim 15, characterized in that the device includes a picture screen.

19. Method as claimed in claim 1, characterized in that the identification information contains a serial number which serial number is adapted within a group in a predetermined manner, while the serial number of the first or last packet of the group has a predetermined value.

20. Method as claimed in claim 2, characterized in that the identification information contains a flag that has a different value for the first or last packet of a group.

21. Method as claimed in claim 1, characterized in that the main information contains video information and the overlay information contains graphic information.

22. Method as claimed in claim 1, characterized in that the overlay information contains subtitle texts.

23. Method as claimed in claim 1, characterized in that the main information contains digital, compressed video information.

24. Information carrier as claimed in claim 8, characterized in that the identification information contains a serial number, which serial number is adapted within a group in a predetermined manner, while the serial number of the first or the last packet of the group has a predetermined value.

25. Information carrier as claimed in claim 9, characterized in that the identification information contains a flag that has a different value for the first or last packet of a group.

26. Information carrier as claimed in claim 8, characterized in that the main information contains video information and the overlay information contains graphic information.

27. Information carrier as claimed in claim 8, characterized in that the overlay information contains subtitle texts.

28. Information carrier as claimed in claim 8, characterized in that the main information contains digital, compressed video information.

29. Device as claimed in claim 15, characterized in that the receiving means comprise means for reading the information signal from an information carrier as defined in claim 8.

* * * * *

UNITED STATES PATENT AND TRADEMARK OFFICE
CERTIFICATE OF CORRECTION

PATENT NO.      : 6,111,589
DATED           : August 29, 2000
INVENTOR(S)     : Wiebe De Haan It is certified that error appears in the above-identified patent and that said Letters Patent is hereby corrected as shown below:

<u>Title page, Item [54] and Column 1, line 1,</u>
Title, delete "AND DEVICE".

Signed and Sealed this

Twenty-second Day of April, 2003

JAMES E. ROGAN
*Director of the United States Patent and Trademark Office*